(12) United States Patent
Ishii et al.

(10) Patent No.: US 11,466,767 B2
(45) Date of Patent: Oct. 11, 2022

(54) WORM REDUCER

(71) Applicant: NSK LTD., Tokyo (JP)

(72) Inventors: Toru Ishii, Maebashi (JP); Toru Segawa, Maebashi (JP)

(73) Assignee: NSK LTD., Tokyo (JP)

( * ) Notice: Subject to any disclaimer, the term of this patent is extended or adjusted under 35 U.S.C. 154(b) by 126 days.

(21) Appl. No.: 16/331,199

(22) PCT Filed: Sep. 20, 2017

(86) PCT No.: PCT/JP2017/033862
§ 371 (c)(1),
(2) Date: Mar. 7, 2019

(87) PCT Pub. No.: WO2018/056296
PCT Pub. Date: Mar. 29, 2018

(65) Prior Publication Data
US 2019/0234505 A1    Aug. 1, 2019

(30) Foreign Application Priority Data

Sep. 21, 2016  (JP) .............................. JP2016-184172
Jun. 12, 2017  (JP) .............................. JP2017-114833

(51) Int. Cl.
*F16H 57/039* (2012.01)
*F16H 1/16* (2006.01)
(Continued)

(52) U.S. Cl.
CPC ......... *F16H 57/021* (2013.01); *B62D 5/0403* (2013.01); *B62D 5/0409* (2013.01);
(Continued)

(58) Field of Classification Search
CPC .......... F16H 1/16; F16H 55/24; F16H 57/021; F16H 57/039; F16H 2057/0213; F16H 57/0498
See application file for complete search history.

(56) References Cited

U.S. PATENT DOCUMENTS 3,126,753 A    3/1964   Leach
6,269,709 B1   8/2001   Sangret
(Continued)

FOREIGN PATENT DOCUMENTS

CN    1736014 A    2/2006
CN    1738983 A    2/2006
(Continued)

OTHER PUBLICATIONS

Search Report dated Nov. 7, 2017, issued by the International Searching Authority in counterpart International Patent Application No. PCT/JP2017/033862 (PCT/ISA/210).
(Continued)

*Primary Examiner* — Bobby Rushing, Jr.
(74) *Attorney, Agent, or Firm* — Sughrue Mion, PLLC

(57) ABSTRACT

A worm reducer includes: a housing including a wheel accommodating portion, and a worm accommodating portion; a worm wheel including wheel teeth disposed on an outer circumferential surface and rotatably supported inside the wheel accommodating portion; and a worm including worm teeth disposed on an outer circumferential surface to mesh with the wheel teeth and rotatably supported inside the worm accommodating portion, wherein a proximal end portion of the worm is connected to a drive shaft such that torque can be transmitted. An inner circumferential surface of the worm accommodating portion includes a housing side step surface which faces a proximal end side in an axial direction of the worm. An outer circumferential surface of the worm includes a worm side step surface which closely (Continued)

faces the housing side step surface in the axial direction at a portion axially deviated from a portion where the worm teeth are disposed.

9 Claims, 10 Drawing Sheets

(51) Int. Cl.
    *F16H 57/04*     (2010.01)
    *F16H 55/24*     (2006.01)
    *F16H 57/021*     (2012.01)
    *B62D 5/04*     (2006.01)
    *F16H 57/031*     (2012.01)

(52) U.S. Cl.
    CPC ............. *F16H 1/16* (2013.01); *F16H 57/031* (2013.01); *F16H 57/039* (2013.01); *F16H 57/0498* (2013.01); *F16H 55/24* (2013.01); *F16H 2057/0213* (2013.01)

(56) References Cited

U.S. PATENT DOCUMENTS

| | | | |
|---|---|---|---|
| 6,708,796 B2* | 3/2004 | Kinme | F16H 57/021 |
| | | | 180/444 |
| 7,183,681 B2* | 2/2007 | Segawa | H02K 5/1732 |
| | | | 310/68 B |
| 2005/0183902 A1 | 8/2005 | Segawa et al. | |
| 2006/0117889 A1 | 6/2006 | Segawa et al. | |
| 2007/0251757 A1 | 11/2007 | Segawa et al. | |
| 2007/0251758 A1 | 11/2007 | Segawa et al. | |
| 2015/0300479 A1 | 10/2015 | Frank | |
| 2015/0336603 A1 | 11/2015 | Yoshikawa et al. | |
| 2017/0174250 A1* | 6/2017 | Segawa | B62D 5/0409 |

FOREIGN PATENT DOCUMENTS

| | | |
|---|---|---|
| CN | 101067437 A | 11/2007 |
| CN | 203239909 U | 10/2013 |
| CN | 104870860 A | 8/2015 |
| CN | 204610703 U | 9/2015 |
| GB | 688559 A | 3/1953 |
| JP | 11-20724 A | 1/1999 |
| JP | 2002-323093 A | 11/2002 |
| JP | 2003-301891 A | 10/2003 |
| JP | 4381024 B2 | 12/2009 |
| JP | 2014-125113 A | 7/2014 |
| JP | 2016-3760 A | 1/2016 |
| JP | 2016-94159 A | 5/2016 |
| WO | 2016/151306 A1 | 9/2016 |

OTHER PUBLICATIONS

Written Opinion dated Nov. 7, 2017, issued by the International Searching Authority in counterpart International Patent Application No. PCT/JP2017/033862 (PCT/ISA/237).
Communication dated Aug. 1, 2019, issued by the European Patent Office in counterpart European Application No. 17853066.3.
Office Action dated Jun. 2, 2021, issued by the State Intellectual Property Office of P.R. China in counterpart Chinese Patent Application No. 201780056106.5.

* cited by examiner

WORM REDUCER

TECHNICAL FIELD

The present invention relates to a worm reducer incorporated and used in, for example, an electric power steering device.

BACKGROUND ART

FIG. 9 illustrates an example of a conventional structure of a steering device for an automobile. Rotation of a steering wheel 1 is transmitted to an input shaft 3 of a steering gear unit 2, and a pair of left and right tie rods 4 are pushed or pulled along with rotation of the input shaft 3 to apply a steering angle to front wheels. The steering wheel 1 is supported and fixed to a rear end portion of a steering shaft 5. The steering shaft 5 is rotatably supported to a cylindrical steering column 6 with being axially inserted in the steering column 6. A front end portion of the steering shaft 5 is connected to a rear end portion of an intermediate shaft 8 through a universal joint 7, and a front end portion of the intermediate shaft 8 is connected to the input shaft 3 through another universal joint 9.

In the example illustrated in FIG. 9, there is provided an electric power steering device for reducing a force required to operate the steering wheel 1 by using an electric motor 10 as an auxiliary power source. The electric power steering device includes a reducer. As such reducer, there has been generally used a worm reducer having a large lead angle and reversibility in a transmission direction of power. FIG. 10 illustrates an example of a conventional structure of a worm reducer described in Japanese Patent No. 4381024. The worm reducer 11 includes a housing 12, a worm wheel 13, and a worm 14.

The housing 12 is supported and fixed to the electric motor 10 and includes a wheel accommodating portion 15 and a worm accommodating portion 16. A center axis of the worm accommodating portion 16 is arranged at a skew position with respect to a center axis of the wheel accommodating portion 15, and the worm accommodating portion 16 has an axially intermediate portion open to the wheel accommodating portion 15. The worm wheel 13 includes wheel teeth 17 on an outer circumferential surface. The worm wheel 13 is supported and fixed to a front side portion of the steering shaft 5 (see FIG. 9) coaxially with the steering shaft 5 which is rotatably supported inside the wheel accommodating portion 15. The worm 14 includes worm teeth 18 meshing with the wheel teeth 17 on the outer circumferential surface of the axial intermediate portion. In the worm 14, two positions in the axial direction interposing the worm teeth 18 are rotatably supported inside the worm accommodating portion 16 by a pair of rolling bearings 19a, 19b, such as a deep groove ball bearing. An output shaft of the electric motor 10 is connected to a proximal end portion (a left end portion in FIG. 10) of the worm 14. That is, the worm 14 can be rotationally driven by the electric motor 10.

In the worm reducer 11, a distal end portion (a right end portion in FIG. 10) of the worm 14 is elastically pressed in the radial direction toward the worm wheel 13 (an upper side in FIG. 10). Accordingly, a backlash between the wheel teeth 17 and the worm teeth 18 is suppressed, and generation of harsh tooth rattling noise at a meshing portion between the wheel teeth 17 and the worm teeth 18 is prevented. Specifically, the proximal end portion of the worm 14 is supported to allow slight swing with respect to the worm accommodating portion 16 via the rolling bearing 19a on the proximal end side among the pair of rolling bearings 19a, 19b. Since a swing angle of the worm 14 is small, such swing can be easily absorbed by using a bearing having small moment rigidity, such as a single-row deep-groove ball bearing, as the rolling bearing 19a on the proximal end side. A pressing piece 20 is externally fitted to a distal end portion of the worm 14, and a coil spring 21 is provided between the pressing piece 20 and the worm accommodating portion 16. The distal end portion of the worm 14 is elastically pressed toward the worm wheel 13 (an upper side in FIG. 10) in a direction orthogonal to a center axis of the worm wheel 13 and a center axis of the worm 14 (an upper-lower direction in FIG. 10) via the pressing piece 20 by the coil spring 21.

PRIOR ART DOCUMENT

Patent Document

Patent Document 1: Japanese Patent No. 4381024

SUMMARY OF THE INVENTION

Problem to be Solved

In the conventional worm reducer 11, the meshing portion between the wheel teeth 17 and the worm teeth 18 is lubricated with grease, but there is room of improvement in maintaining lubricity of the meshing portion for a long period of time. That is, when grease is pushed out from the meshing portion, the pushed grease moves in the axial direction of the worm 14 to escape from the meshing portion to enter the rolling bearings 19a, 19b. Accordingly, it is possible that the grease used for lubrication of the meshing portion may be reduced.

In view of the above circumstances, an aspect of the present invention provides a structure of a worm reducer capable of maintaining lubricity of the meshing portion between wheel teeth and worm teeth for a long period of time.

Means for Solving the Problem

A worm reducer according to an embodiment of the present invention includes: a housing, worm wheel and a worm.

The housing includes a wheel accommodating portion, and a worm accommodating portion which has a center axis arranged at a skew position with respect to a center axis of the wheel accommodating portion and which includes an axial intermediate portion open to the wheel accommodating portion.

The worm wheel includes wheel teeth disposed on an outer circumferential surface and is rotatably supported inside the wheel accommodating portion.

The worm includes worm teeth disposed on an outer circumferential surface to mesh with the wheel teeth and is rotatably supported inside the worm accommodating portion, wherein a proximal end portion of the worm is connected to a drive shaft such that torque can be transmitted.

An inner circumferential surface of the worm accommodating portion includes a housing side step surface which faces a proximal end side in an axial direction of the worm, and An outer circumferential surface of the worm includes a worm side step surface which closely faces the housing side step surface in the axial direction at a portion axially deviated from a portion where the worm teeth are disposed.

The housing side step surface and the worm side step surface may be parallel to each other.

The housing side step surface may be provided around an entire circumference of the worm accommodating portion and the worm side step surface may be provided around an entire circumference of the worm.

The worm side step surface may be provided on the outer circumferential surface of the worm at a portion on a proximal end side than the worm teeth in the axial direction of the worm and has an outer diameter larger than a tip diameter of the worm teeth.

Alternatively, the worm side step surface may be provided on the outer circumferential surface of the worm at a portion on a distal end side than the worm teeth in the axial direction of the worm and has an outer diameter equal to or smaller than a tip diameter of the worm teeth.

An axial interval between the worm side step surface and the housing side step surface may be shorter than a minimum value of an axial interval between a tooth bottom surface of a dummy tooth portion present at an end portion of the worm teeth on a proximal end side in the axial direction of the worm and a tooth tip surface of the wheel teeth.

Specifically, the worm is rotatably supported inside the worm accommodating portion by a bearing at least one position of two axial positions interposing the worm teeth. As such a bearing, for example, a rolling bearing including an outer ring including an outer ring raceway on an inner circumferential surface, an inner ring including an inner ring raceway on an outer circumferential surface, and a plurality of rolling elements rotatably provided between the outer ring raceway and the inner ring raceway may be used. In a case where the rolling bearing is used as the bearing, a radial ball bearing, a radial roller bearing, a radial taper roller bearing, or the like may be used. Alternatively, a sliding bearing may also be used as the bearing.

Effects of the Invention

In the worm reducer having the above configuration, the housing side step surface provided on the inner circumferential surface of the worm accommodating portion and the worm side step surface provided on the outer circumferential surface of the worm closely face each other. Therefore, due to a labyrinth effect occurring between the housing side step surface and the worm side step surface, grease pushed out from the meshing portion between the wheel teeth and the worm teeth can be prevented from moving in the axial direction of the worm and escaping from the meshing portion. Consequently, lubricity of the meshing portion can be maintained for a long period of time.

DESCRIPTION OF EMBODIMENT

First Example of Embodiment

Figure 10:
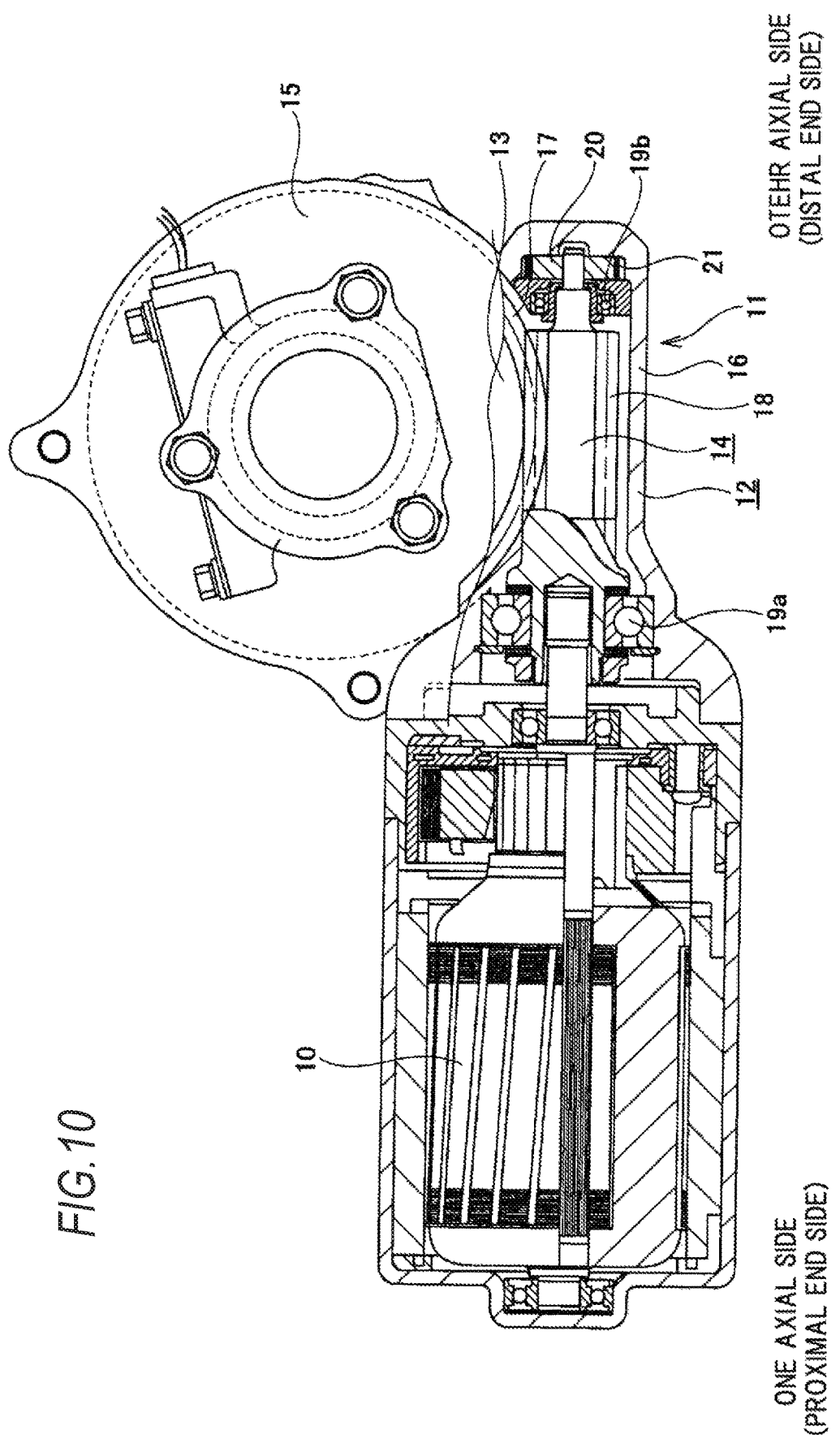
FIG. 10 is an enlarged cross-sectional view along c-c line in FIG. 9.

FIGS. 1 to 4 illustrate a first example of an embodiment of the present invention. A worm reducer 11a of this embodiment includes a housing 12a, a worm wheel 13, and a worm 14, similarly to the worm reducer 11 having a conventional structure illustrated in FIG. 10.

The housing 12a is supported and fixed to an electric motor 10 (refer to FIG. 10) and includes a wheel accommodating portion 15 and a worm accommodating portion 16a. A center axis of the worm accommodating portion 16a is arranged at a skew position with respect to a center axis of the wheel accommodating portion 15, and an axial intermediate portion of the worm accommodating portion 16a opens to the wheel accommodating portion 15. A small-diameter portion 22 is provided on an inner circumferential surface of the axial intermediate portion of the worm accommodating portion 16a, and holding recesses 23a, 23b each having an inner diameter larger than that of the small-diameter portion 22 are provided on inner circumferential surfaces of both axial end portions of the worm accommodating portion 16a. A housing side step surface 24 which faces one axial side is provided over the entire circumference on another axial end portion (a left end portion in FIG. 1) of a connection portion between the holding recess 23a on the one axial side (right side in FIG. 1) and the small-diameter portion 22. A cylindrical surface portion 65 whose inner diameter does not change in the axial direction is provided at an intermediate portion of the connection portion between the holding recess 23a on the one axial side (right side in FIG. 1) and the small-diameter portion 22. In this example, the housing side step surface 24 is a partial conical surface inclined in a direction in which the inner diameter increases as proceeding toward the one axial side. Incidentally, the cylindrical surface portion 65 may be omitted. The housing 12a can be formed by casting iron-based metal having sufficient rigidity and durability, die cast molding a light alloy such as an aluminum-based alloy, injection molding a synthetic resin or the like.

The one axial side refers to a side of the proximal end portion of the worm 14a rotatably supported on an inner side of the worm accommodating portion 16a, and the other axial side refers to the distal end side of the worm 14a.

Figure 9:
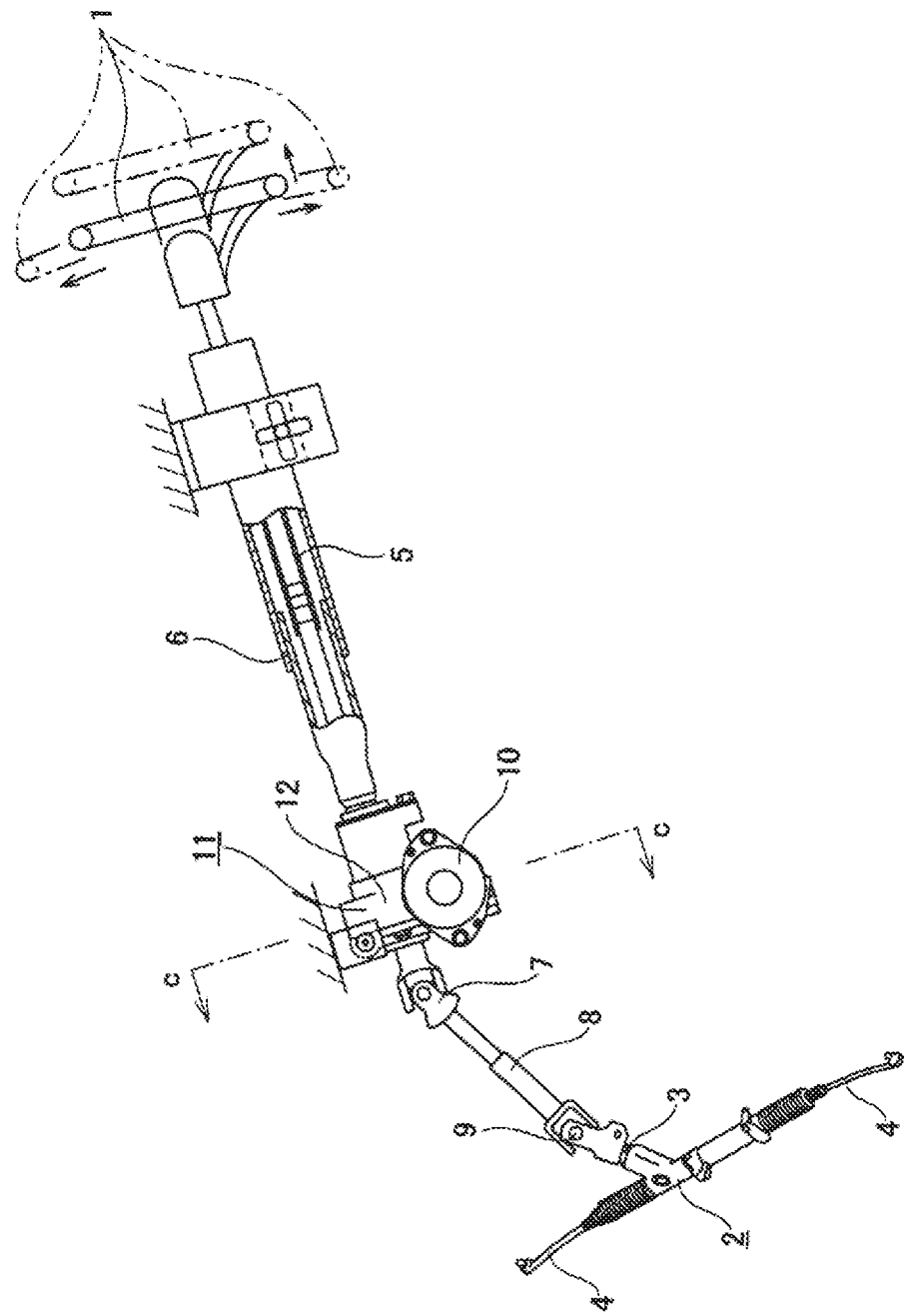
FIG. 9 is a partially cut side view illustrating an example of a conventional structure of a steering device.

The worm wheel 13 includes wheel teeth 17 disposed on an outer circumferential surface thereof and is rotatably supported and fixed coaxially with a steering shaft 5 on a front side portion of the steering shaft 5 (see FIG. 9), which is a driven shaft rotatably supported on the inner side of the wheel accommodating portion 15.

An axial intermediate portion of the worm 14a includes a medium-diameter portion 25 having an outer diameter larger than that of a portion adjacent to the other axial side, and worm teeth 18 are disposed on an outer circumferential surface of a portion ranging from one axial side portion to the other axial end edge of the medium-diameter portion 25. The outer circumferential surface of the worm 14a includes an outward flange portion 26 protruding radially outward over the entire circumference at a portion adjacent to one axial side of the medium-diameter portion 25, and a worm side step surface 27 is provided over the entire circumference on the other axial side surface of the outward flange portion 26. Therefore, the outer diameter of the worm side step surface 27 is larger than a tip diameter of the worm teeth 18.

One axial end portion of the worm teeth 18 includes a dummy tooth portion 51 whose tooth height decreases as proceeding toward the one axial side and cannot properly mesh with the wheel teeth 17. The dummy tooth portion 51 is formed, for example, as follows when the worm 14a is formed. That is, in order to form the worm 14a, first, a stepped columnar member including the medium-diameter portion 25 at the axial intermediate portion, and the outward flange portion 26 at the portion adjacent to one axial side of the medium-diameter portion 25 is obtained by performing a cutting processing on a columnar metal material. Next, a cutting edge of a milling cutter is pressed against the one axial side portion of the outer circumferential surface of the medium-diameter portion 25 of the stepped columnar member. In this state, the milling cutter and the stepped columnar member are rotated in the same direction and are relatively displaced in the axial direction, so that the worm teeth 18 are formed in a portion extending from the one axial side portion to the other axial end edge of the medium-diameter portion 25 to form the worm 14a. Accordingly, the one axial end portion of the worm teeth 18, which is a cutting start position by the milling cutter, is formed with the dummy tooth portion 51 having a smaller tooth height as proceeding toward the one axial side.

In a state where the worm 14a is rotatably supported inside the worm accommodating portion 16a, a radially inner half portion of the housing side step surface 24 and a radially outer half portion of the worm side step surface 27 directly and closely face each other without any other member interposed therebetween. Therefore, an outer diameter $D_{27}$ of the worm side step surface 27 is larger than an inner diameter of the housing side step surface 24, that is, an inner diameter $d_{22}$ of the small-diameter portion 22 of the worm accommodating portion 16a ($D_{27} > d_{22}$). With this configuration, a labyrinth portion which is inclined in a direction toward a radially outer side as proceeding toward the one axial side is formed between the housing side step surface 24 and the worm side step surface 27. The other axial end of the labyrinth portion is connected to one end portion of a cylindrical space between the small-diameter portion 22 of the worm accommodating portion 16a and the outer circumferential surface of the worm teeth 18.

In this embodiment, the housing side step surface 24 and the worm side step surface 27 are parallel to each other. That is, the worm side step surface 27 is inclined in a direction in which the outer diameter increases as proceeding toward the one axial side to form a partial conical surface parallel to the housing side step surface 24. An axial interval L between the housing side step surface 24 and the worm side step surface 27 varies depending on an axial length, outer diameter, and the like of the worm 14a, and may be about 1 mm to 5 mm in a case of the worm reducer incorporated in an electric power steering device for a typical automobile.

Further, in this example, the axial interval L between the housing side step surface 24 and the worm side step surface 27 is shorter than a minimum value of an axial interval between a tooth bottom surface of the dummy tooth portion 51 and a tooth tip surface of the wheel teeth 17 and is shorter than an axial length of a fitting portion of a cover 42 (described later) to an opening portion of the holding recess 23b on the other axial side.

The outer circumferential surface of the outward flange portion 26 is a cylindrical surface whose outer diameter does not change in the axial direction, and a radial gap is provided between the outer circumferential surface of the outward flange portion 26 and the cylindrical surface portion 65 of the worm accommodating portion 16a. That is, the inner diameter of the cylindrical surface portion 65 is larger than an outer diameter of the outer circumferential surface of the outward flange portion 26. The worm side step surface 27 may be formed on the outer circumferential surface of the outward flange portion 26 in the axial direction. That is, the outer circumferential surface of the outward flange portion 26 may be inclined along the axial direction in a direction in which the outer diameter increases as proceeding toward the one axial side and have a partial conical surface parallel to the housing side step surface 24.

In the worm 14a, two axial positions interposing the worm teeth 18 are rotatably supported inside the worm accommodating portion 16a by a pair of rolling bearings 19a, 19c, such as a deep-groove ball bearing in a state where the worm teeth 18 mesh with the wheel teeth 17. Grease is applied to the meshing portion between the wheel teeth 17 and the worm teeth 18.

An inner ring of the rolling bearing 19a on the proximal end side (one axial side, right side in FIG. 1) is externally fitted and fixed by an interference fit to a bearing fitting portion 53a provided at a proximal end side portion of the worm 14a in a state where the other axial end surface of the inner ring abuts on the one axial side surface of the outward flange portion 26. The outer ring of the rolling bearing 19a on the proximal end side is internally fitted into the holding recess 23a on the one axial side. In this state, the outer ring of the roller bearing 19a on the proximal end side is clamped by an abutting step surface 28 provided at the other axial end portion of the holding recess 23a on the one axial side and a retaining ring 29 engaged to an axial intermediate portion of the holding recess 23a on the one axial side.

Among the pair of rolling bearings 19a, 19c, an inner ring of the rolling bearing 19c on a distal end side (the other axial side, left side in FIG. 1) is externally fitted to a bearing fitting portion 53b provided at a distal end portion of the worm 14a by an interference fit. An outer ring of the rolling bearing 19c on the distal end side is internally fitted and supported on the holding recess 23b on the other axial side via an elastic biasing mechanism 30.

The elastic biasing mechanism 30 includes an outer holder 31, a bearing holder 32, a leaf spring 33, and a pair of wedge-shaped pieces 34. The outer holder 31 includes a holder main body 35 and a lid body 36 and is internally fitted and held in the holding recess 23b on the other axial side by clearance fit in a state where rotation is prohibited.

The bearing holder 32 is internally fitted and held inside the outer holder 31 to be displaceable in a close/separate moving direction (an upper-lower direction in FIG. 1 to FIG. 2) A with respect to the worm wheel 13 which is a direction orthogonal to the center axis of the worm wheel 13 and the center axis of the worm 14a. A pair of notch portions 37 is provided at two positions of the other axial end edge of the bearing holder 32 which are substantially opposite in the radial direction. The leaf spring 33 is formed by bending a metal plate having elasticity into a partially cylindrical shape, and both end portions in the circumferential direction are engaged to the pair of notch portions 37. Therefore, in a state where the rolling bearing 19b on the distal end side is internally fitted and held inside the bearing holder 32, the rolling bearing 19c on the distal end side is biased in the radial direction by elasticity of the leaf spring 33 and is elastically pressed against the inner circumferential surface of the bearing holder 32.

A pair of wedge-shaped pieces 34 is arranged to fill portions of an annular space existing between the inner circumferential surface of the holding recess 23b of the other axial side and the outer circumferential surface of the bearing holder 32 in two positions sandwiching an imaginary plane a including the center axis of the worm 14a and the meshing portion between the wheel teeth 17 and the worm teeth 18. The thickness of the pair of wedge-shaped pieces 34 in the radial direction increases in the circumferential direction from an end portion on a side farther from the meshing portion toward an end portion on a side closer to the meshing portion. Accordingly, a radius of curvature of the outer circumferential surface of the pair of wedge-shaped pieces 34 is the same as a radius of curvature of the inner circumferential surface of the holding recess 23b on the other axial side, and the radius of curvature of the inner circumferential surface of the pair of wedge-shaped pieces 34 is larger than the radius of curvature of the outer circumferential surface of the bearing holder 31. The pair of wedge-shaped pieces 34 are applied with elasticity in a direction away from the meshing portion in the circumferential direction by a torsion coil spring 38. That is, the small-diameter cylindrical portion 39 of the bearing holder 31 is inserted into a coil portion 40 of a torsion coil spring 35, and a pair of arm portions 41 of the torsion coil spring 35 is pressed against an end surface on the side closer to the meshing portion among both end surfaces in the circumferential direction of the pair of wedge-shaped pieces 34. With such a configuration, the distal end portion of the worm 14a is elastically biased to a side of the worm wheel 13 in a close/separate moving direction A with respect to the worm wheel 13, thereby suppressing backlash in the meshing portion. In this example, the cover 42 is press-fitted into the opening portion of the holding recess 23b, so that the opening portion is closed.

The proximal end portion of the worm 14a is coupled to a distal end portion of an output shaft 52 of the electric motor 10 via a torque transmission joint 43 such that torque can be transmitted. The torque transmission joint 43 includes a driving-side transmission member 44, a driven-side transmission member 45, and a coupling 46. The driving-side transmission member 44 is configured into a substantially cylindrical shape and includes a driving-side concave-convex portion 47 in which concave portions and convex portions are alternately arranged over an entire outer circumferential surface between the other axial end portion to the intermediate portion. The driving-side transmission member 44 is externally fitted and fixed to the distal end portion of the output shaft 52 of the electric motor 10 by an interference fit. The driven-side transmission member 45 has a substantially cylindrical shape and includes a driven-side concave-convex portion 48 in which concave portions and convex portions are alternately arranged over an entire outer circumferential surface between one axial end portion to the intermediate portion. The driven-side transmission member 45 is externally fitted and fixed to a connecting shaft portion 49 provided on the proximal end portion of the worm 14a by an interference fit.

The coupling 46 has a substantially cylindrical shape and includes a coupling-side concave-convex portion 50 in which the concave portions and the convex portions are alternately arranged over an entire inner circumferential surface. The height (height of each tooth) in the radial direction of the convex portions constituting the coupling-side concave-convex portion 50 is smaller at both axial end portions than the axial intermediate portion. A driving-side concave-convex portion 47 of the driving-side transmission member 44 is engaged to one axial half portion of the coupling-side concave-convex portion 50 such that torque can be transmitted. Specifically, the distal end surface of the axial intermediate portion of each of the convex portions constituting the coupling-side concave-convex portion 50 is lightly pressed into a bottom surface of the other axial half portion of each of the concave portions constituting the driving-side concave-convex portion 47. That is, the distal end surface of the axial intermediate portion of each of the convex portions constituting the coupling-side concave-convex portion 50 and the bottom surface of the other axial half portion of each of the concave portions constituting the driving-side concave-convex portion 47 abut on each other with surface pressure to be slidable in the circumferential direction at the start of torque transmission between the output shaft 52 and the worm 14a. In contrast, a radial gap is interposed between a distal end surface of one axial end portion of each of the convex portions constituting the coupling-side concave-convex portion 50 and a bottom surface of each of the concave portions of one axial half portion of each of the concave portions constituting the driving-side concave-convex portion 47, and between the bottom surface of each of the concave portions constituting the coupling-side concave-convex portion 50 and the distal end surface of each of the convex portions constituting the driving-side concave-convex portion 47, respectively.

On the other hand, the driven-side concave-convex portion 48 of the driven-side transmission member 45 is engaged to the other axial half portion of the coupling-side concave-convex portion 50 such that torque can be transmitted. Specifically, the distal end surface of the axial intermediate portion of each of the convex portions constituting the coupling-side concave-convex portion 50 is lightly pressed into the bottom surface of one axial half portion of each of the concave portions constituting the driven-side concave-convex portion 48. That is, the distal end surface of the axial intermediate portion of the convex portion constituting the coupling-side concave-convex portion 50 and the bottom surface of one axial half portion of the concave portion constituting the driven-side concave-convex portion 48 abut on each other with surface pressure to be slidable in the circumferential direction at the start of torque transmission between the output shaft 52 and the worm 14a. In contrast, a radial gap is interposed between a distal end surface of the other axial end portion of each of the convex portions constituting the coupling-side concave-convex portion 50 and a bottom surface of each of the concave portions of the other axial half portions of the concave portions constituting the driven-side concave-convex portion 48 and between the bottom surface of each of the concave portions constituting the coupling-side concave-convex portion 50 and the distal end surface of each of the convex portions constituting the driven-side concave-convex portion 48, respectively.

In the worm reducer 11a of this example, the housing side step surface 24 provided on the inner circumferential surface of the worm accommodating portion 16a and the worm side step surface 27 provided on the outer circumferential surface of the worm 14a closely face each other. Therefore, due to a labyrinth effect occurring between the housing side step surface 24 and the worm side step surface 27, grease pushed out from the meshing portion between the wheel teeth 17 and the worm teeth 18 can be prevented from moving in the axial direction of the worm 14*a* and escaping from the meshing portion. Consequently, lubricity of the meshing portion can be maintained for a long period of time.

When an incident occurs where a steered wheel of an automobile equipped with an electric power steering device including the worm reducer 11*a* of this example rides on a curbstone and an impact load is applied in the direction toward the other axial side to the worm 14*a* via the worm wheel 13 from a side of the steering gear unit 2 (refer to FIG. 9), the worm 14*a* may be displaced toward the other axial side.

In this example, since the axial interval L between the housing side step surface 24 and the worm side step surface 27 is shorter than the minimum value of the axial interval between the tooth bottom surface of the dummy tooth portion 51 and the tooth tip surface of the wheel teeth 17, the worm side step surface 27 and the housing side step surface 24 collide with each other before the tooth bottom surface of the dummy tooth portion 51 interferes with the tooth tip surface of the wheel teeth 17 even if the worm 14*a* is displaced toward the other axial side. As a result, the interference between the tooth bottom surface of the dummy tooth portion 51 and the tooth tip surface of the wheel teeth 17 can be reliably prevented, and damage such as flaws on tooth surfaces of the worm teeth 18 and the wheel teeth 17 can be reliably prevented. Further, since the interval L is shorter than the axial length of the fitting portion of the cover 42 to the opening portion of the holding recess 23*b* on the other axial side, even when the worm 14*a* is displaced toward the other axial side, the cover 42 can be reliably prevented from falling off from the opening portion of the holding recess 23*b* on the other axial side. That is, even when the worm 14*a* is displaced toward the other axial side by the interval L, fitting of the cover 42 to the opening portion of the holding recess 23*b* is maintained.

In this example, since the worm side step surface 27 and the housing side step surface 24 are parallel to each other, the worm side step surface 27 and the housing side step surface 24 are brought into surface contact with each other when the worm side step surface 27 collides with the housing side step surface 24. Further, since the worm side step surface 27 is provided on a portion of the worm 14*a* which is adjacent to one axial side of the middle-diameter portion 25, the outer diameter of the worm side step surface 27 is relatively large. As a result, an abutment area between the worm side step surface 27 and the housing side step surface 24 can be made relatively large, and stress can be effectively prevented from being concentrated on an abutment portion between the worm side step surface 27 and the housing side step surface 24.

The effect of preventing the interference between the tooth bottom surface of the dummy tooth portion 51 and the tooth tip surface of the wheel teeth 17 due to that the interval L is shorter than the minimum value of the axial interval between the tooth bottom surface of the dummy tooth portion 51 and the tooth tip surface of the wheel teeth 17 and the effect of preventing the cover 42 from falling off due to that the interval L is shorter than the axial length of the fitting portion of the cover 42 to the opening of the holding recess 23*b* on the other side in the axial direction can be obtained when the worm reducer 11*a* of this example is assembled as follows.

First, the worm wheel 13 is rotatably supported in the wheel accommodating portion 15. Next, the worm 14*a* is inserted into the inside of the worm accommodating portion 16*a* from one axial side opening portion of the worm accommodating portion 16*a*. Next, the other axial end portion of the worm teeth 18 is brought to meshing with the wheel teeth 17. Further, while the worm wheel 13 is rotated in a state where the other axial end portion of the worm teeth 18 meshes with the wheel teeth 17, the worm 14*a* is further inserted (pushed) into the worm accommodating portion 16*a*. After the worm 14*a* is pushed to a predetermined position in the worm accommodating portion 16*a*, the elastic biasing mechanism 30 is inserted (installed) between the distal portion of the worm 14*a* and the holding recess 23*b* on the other axial side from the other axial side opening portion of the worm accommodating portion 16*b*. Thereafter, the cover 42 is press-fitted into the other axial side opening portion of the worm accommodating portion 16*a*. Incidentally, before the worm 14*a* is inserted into the inside of the worm accommodating portion 16*a*, the elastic biasing mechanism 30 and the cover 42 may be installed inside the holding recess 23*b* on the other axial side.

In any case, in this example, since the interval L is shorter than the minimum value of the interval in the axial direction between the tooth bottom surface of the dummy tooth portion 51 and the tooth tip surface of the wheel teeth 17, and shorter than the axial length of the fitting portion of the cover 42 to the opening portion of the holding recess 23*b* on the other axial side, it is possible to reliably prevent an occurrence that the tooth bottom surface of the dummy tooth portion 51 interferes with the tooth tip surface of the wheel teeth 17 or that the cover 42 falls off, which may be caused by excessive pushing when the worm 14*a* is pushed to a predetermined position in the worm accommodating portion 16*a*.

After the worm 14*a* is pushed into the predetermined position in the worm accommodating portion 16*a*, the rolling bearing 19*a* on the proximal end side is installed between the bearing fitting portion 53*a* of the worm 14*a* and the holding recess 23*a* on the one axial side. The output shaft 52 of the electric motor 10 is connected to the proximal end portion of the worm 14*a* via the torque transmission joint 43.

It is noted that, a method of assembling the worm reducer 11*a* is not limited to the above-described method. That is, in a state where one or both of the pair of rolling bearings 19*a*, 19, and the elastic biasing mechanism 30 as necessary may be assembled to the worm 14*a* as a subassembly, the subassembly may be assembled inside the worm accommodating portion 16*a*.

In the worm reducer 11*a* of this example, the elastic biasing mechanism 30 is provided between the holding recess 23*b* on the other axial side and the rolling bearing 19*c* on the distal end side, and the distal end portion of the worm 14*a* is elastically biased toward the side of the worm wheel 13 via the rolling bearing 19*c* on the distal end side. As a result, occurrence of backlash at the meshing portion between the worm teeth 18 and the wheel teeth 17 is suppressed.

The pair of wedge-shaped pieces 34 constituting the elastic biasing mechanism 30 are provided to fill an annular space existing between the inner circumferential surface of the holding recess 23*b* on the other axial side and the outer circumferential surface of the bearing holder 32. The outer circumferential surface of the pair of wedge-shaped pieces 34 is in sliding contact with the inner circumferential surface of the holding recess 23*b* on the other axial side, and the inner circumferential surface of the pair of wedge-shaped pieces 34 is in sliding contact with the outer circumferential surface of the bearing holder 32. As a result, when a rotation direction of the steering shaft 5 is changed, the distal end portion of the worm 14*a* can be prevented from being displaced in the close/separate moving direction A of the worm wheel 13. Further, elasticity in a direction away from the meshing portion in the circumferential direction is applied to each of the pair of wedge-shaped pieces 34. As a result, regardless of wear between the worm teeth 18 and the wheel teeth 17, the distal end portion of the worm 14a can be prevented from being displaced in a direction of the center axis of the worm wheel 13 for a long period of time.

In this example, the output shaft 52 of the electric motor 10 and the worm 14a are coupled via the torque transmission joint 43 such that torque can be transmitted. As a result, occurrence of abnormal noise between the output shaft 52 and the worm 14a can be prevented, and torque transmission between the output shaft 52 and the worm 14a can be smoothly performed even if the center axes of the output shaft 52 and the worm 14a do not coincide with each other.

That is, in this example, the distal end surface of the axial intermediate portion having a large height in the radial direction of each of the convex portions constituting the coupling-side concave-convex portion 50 is lightly pressed into the bottom surface of the other axial half portion of each of the concave portions constituting the driving-side concave-convex portion 47 and the bottom surface of one axial half portion of each of the concave portions constituting the driven-side concave-convex portion 48. Therefore, at the start of torque transmission between the output shaft 52 and the worm 14a, the distal end surface of the axial intermediate portion of each of the convex portions constituting the coupling-side concave-convex portion 50, the bottom surface of the other axial intermediate portion of each of the concave portions constituting the driving-side concave-convex portion 47, and the bottom surface of one axial half portion of each of the concave portions constituting the driven-side concave-convex portion 48 slide in the circumferential direction. Therefore, relative rotation speed between the coupling 46 and the driving-side transmission member 44 and the driven-side transmission member 45 decreases, and force of butting of the circumferential side surface of the coupling-side concave-convex portion 50 and the circumferential side surface of each of the driving-side concave-convex portion 47 and the driven-side concave-convex portion 48 is weakened. As a result, it is possible to prevent generation of abnormal noise such as harsh tooth rattling noise at the meshing portion between the coupling-side concave-convex portion 50, and the driving-side concave-convex portion 47 and the driven-side concave-convex portion 48.

The other axial half portion of the driving-side concave-convex portion 47 and one axial half portion of the driven-side concave-convex portion 48 are each engaged with both axial end portions of the coupling-side concave-convex portion 50 with a radial gap interposed therebetween, and a circumferential gap is interposed between the coupling-side concave-convex portion 50 and each of the driving-side concave-convex portion 47 and the driven-side concave-convex portion 48. Therefore, even when the center axes of the output shaft 52 and the worm 14a do not coincide with each other, the coupling 46 inclines with respect to at least one of shafts of the output shaft 52 and the worm 14a based on the presence of the radial gap and the circumferential gap. As a result, torque is smoothly transmitted between the output shaft 52 and the worm 14a.

When the worm reducer of the present invention is implemented, it is preferable that the housing side step surface and the worm side step surface which face each other are provided over the entire circumference. However, a discontinuous portion may be partially provided.

Further, the elastic biasing mechanism which elastically biases the distal end portion of the worm toward the worm wheel side and the torque transmission joint which couples the worm and the output shaft of the electric motor to enable torque transmission are not limited to the above embodiment, and various conventionally known structures may be employed.

Second Example of Embodiment

Figure 1:
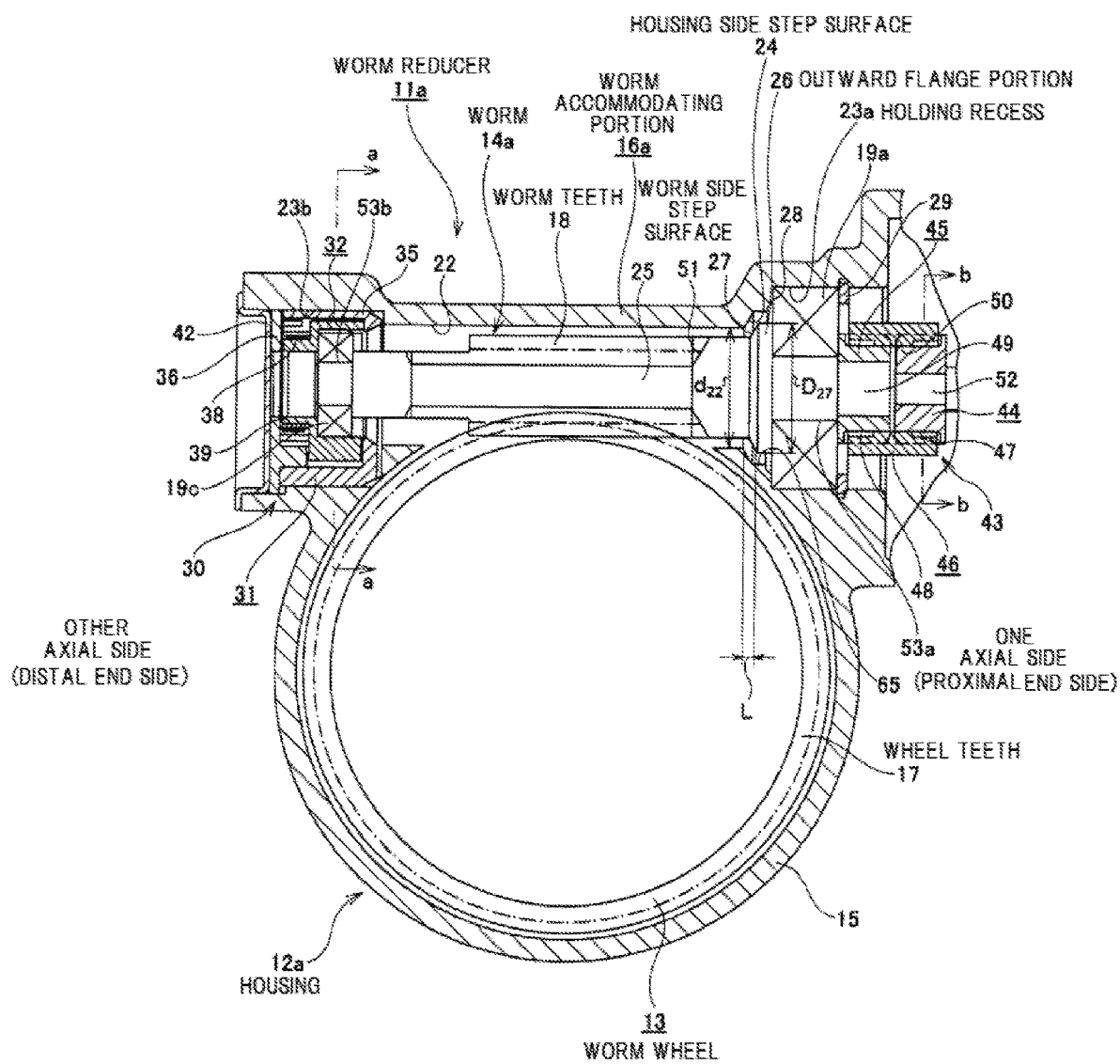
FIG. 1 is a cross-sectional view illustrating a first example of an embodiment of the present invention.
Figure 2:
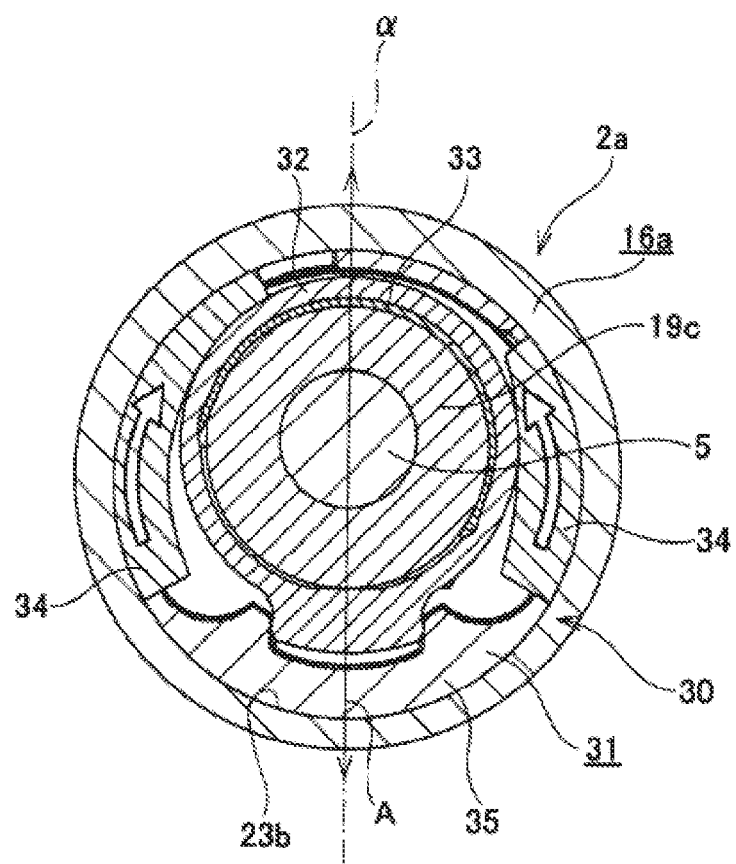
FIG. 2 is a cross-sectional view taken along a-a line in FIG. 1.
Figure 3:
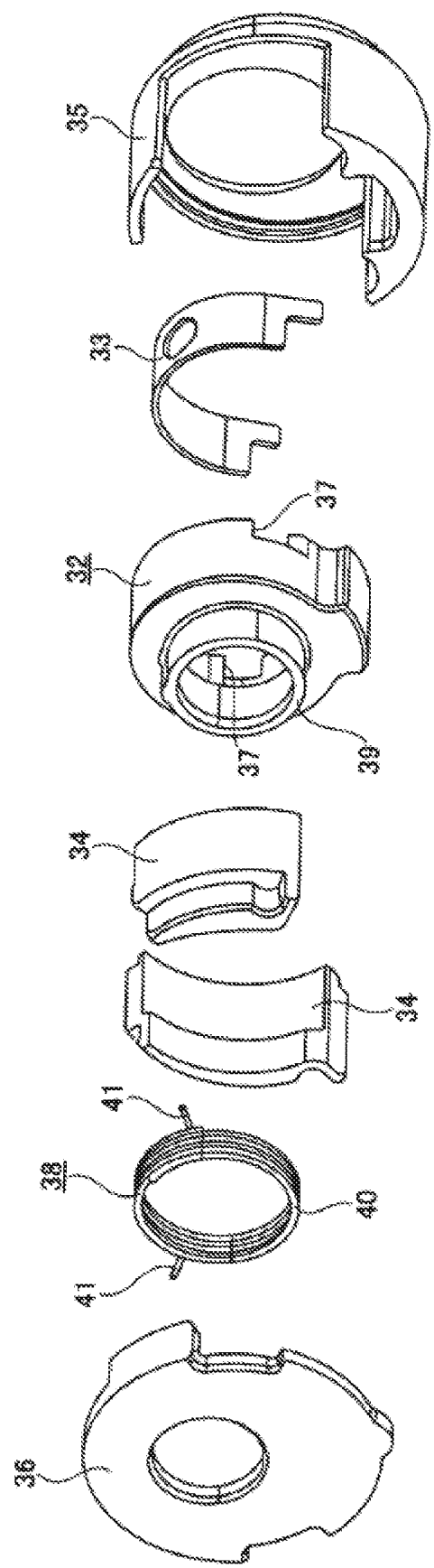
FIG. 3 is a perspective view illustrating respective members constituting an elastic biasing mechanism in a disassembled state according to the first example of the embodiment of the present invention.
Figure 4:
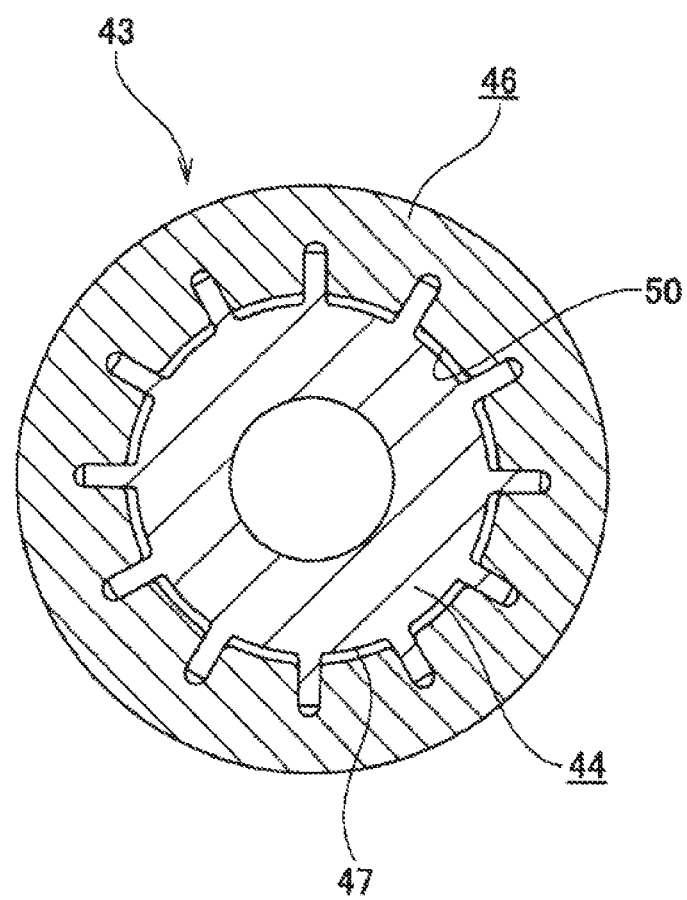
FIG. 4 is a cross-sectional view taken along b-b line in FIG. 1.
Figure 5:
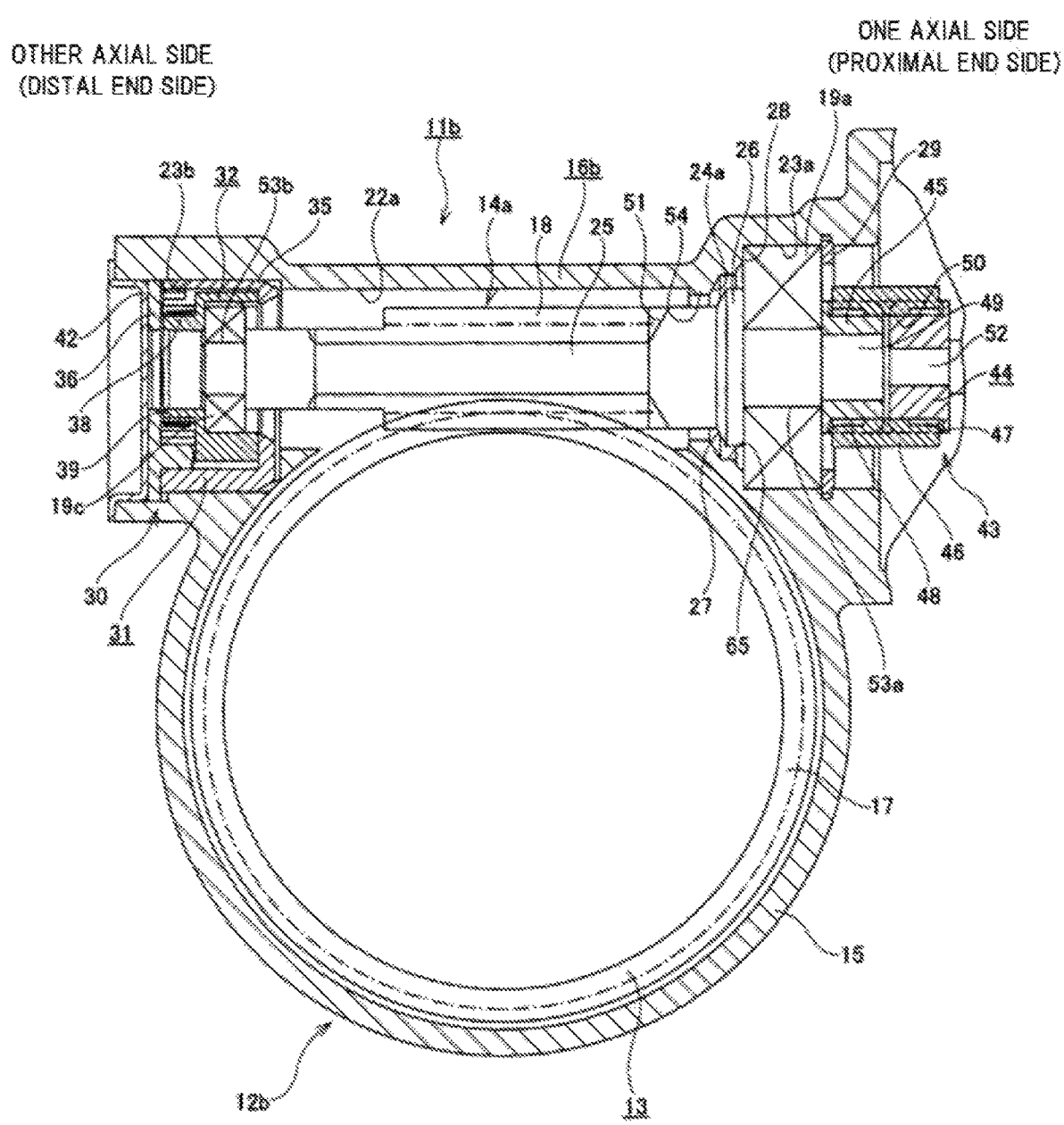
FIG. 5 is a cross-sectional view illustrating a second example of an embodiment of the present invention.

FIG. 5 illustrates a second example of an embodiment of the present invention. In a worm reducer 11b of this example, a small-diameter portion 22a is provided at an axial intermediate portion of an inner circumferential surface of a worm accommodating portion 16b constituting a housing 12b, and the small-diameter portion 22a is provided with an inward flange portion 54 protruding radially inward on one axial end portion thereof. One axial side surface of the inward flange portion 54 is a partially-conical-surface-shaped housing side step surface 24a inclined in a direction in which an inner diameter increases as proceeding toward the one axial side, and the housing side step surface 24a closely faces a worm side step surface 27 provided on an outer circumferential surface of a worm 14a. In this example, a radial gap between a tooth tip surface of the worm teeth 18 of the worm 14a and the small-diameter portion 22a is easily obtained. Configuration and operation of other parts are similar to those of the above-described first embodiment.

Third Example of Embodiment

Figure 6:
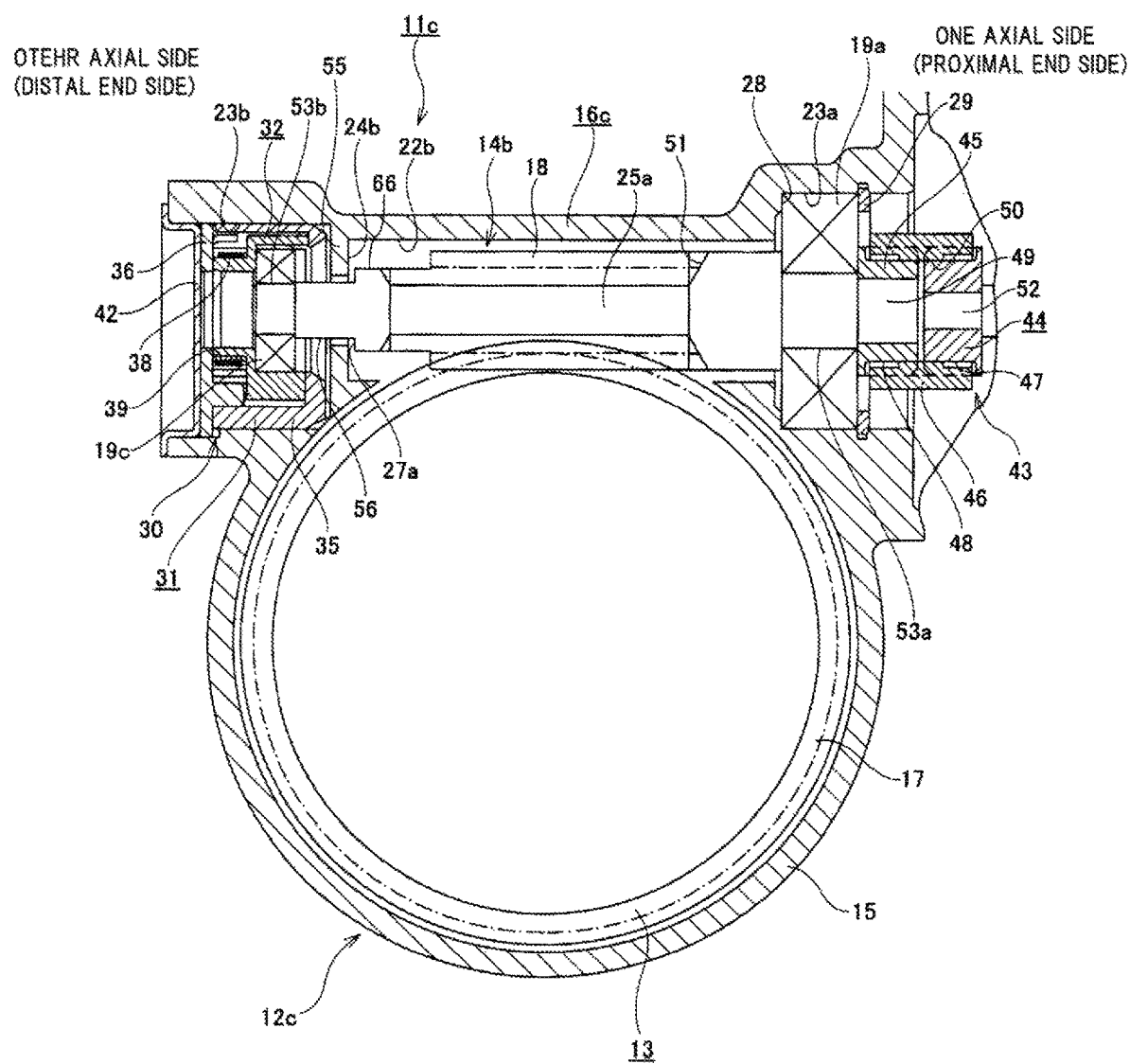
FIG. 6 is a cross-sectional view illustrating a third example of an embodiment of the present invention.

FIG. 6 illustrates a third example of an embodiment of the present invention. In a worm reducer 11c of this example, a small-diameter portion 22b is provided at an axial intermediate portion of an inner circumferential surface of a worm accommodating portion 16c constituting a housing 12c, and an inward flange portion 55 protruding radially inward is provided on the other axial end portion of the small-diameter portion 22b. One axial side surface of the inward flange portion 55 is a housing side step surface 24b. In this example, the housing side step surface 24b is a plane orthogonal to the axial direction of the worm accommodating portion 16b (a left-right direction in FIG. 6).

A cylindrical surface portion 56 having an outer diameter smaller than a medium-diameter portion 25a adjacent to one axial side of an outer circumferential surface of a worm 14b and larger than a bearing fitting portion 53b provided at a distal end portion of a worm 14b is provided on the other axial side of the outer circumferential surface of the worm 14b. The cylindrical surface portion 56 is provided with a worm side step surface 27a facing the other axial side at one axial end portion thereof. In other words, in this example, a step portion 66 having an outer diameter smaller than a tip diameter of the worm teeth 18 is provided at the other axial end portion of the medium-diameter portion 25a, and the cylindrical surface portion 56 and the step portion 66 are connected by the worm side step surface 27a. Incidentally, the step portion 66 may be omitted as long as the outer diameter of the worm side step surface 27a is equal to or smaller than the tip diameter of the worm teeth 18. In this example, the worm side step surface 27a and the housing side step surface 24b directly and closely face each other without any other member disposed therebetween. An axial interval between the housing side step surface 24b and the worm side step surface 27a is shorter than a minimum value of an axial interval between a tooth bottom surface of a dummy tooth portion 51 provided at one axial end portion of the worm teeth 18 and a tooth tip surface of the wheel teeth 17 and is shorter than an axial length of a fitting portion of a cover 42 to an opening portion of a holding recess 23b on the other axial side.

In the worm reducer 11c of this example, due to a labyrinth effect produced between the housing side step surface 24b and the worm side step surface 27a, a reduction in grease supplied for lubrication of the meshing portion can be prevented, which could occur in a case where grease pushed out from the meshing portion between the wheel teeth 17 and the worm teeth 18 largely moves in the axial direction of the worm 14b, escapes from the meshing portion and enters a rolling bearing 19c on a distal end side. Consequently, lubricity of the meshing portion can be maintained for a long period of time.

In addition, in this example, the axial interval between the housing side step surface 24b and the worm side step surface 27a is shorter than a minimum value of the axial interval between the tooth bottom surface of the dummy tooth portion 51 and the tooth tip surface of the wheel teeth 17. Therefore, even when an impact load toward the other axial side is applied to the worm 14b such that the worm 14b is displaced toward the other axial side, the worm side step surface 27b and the housing side step surface 24b collide with each other before the tooth bottom surface of the dummy tooth portion 51 interferes with the tooth tip surface of the wheel teeth 17. As a result, interference between the tooth bottom surface of the dummy tooth portion 51 and the tooth tip surface of the wheel teeth 17 can be reliably prevented, and damage such as flaws on tooth surfaces of the worm teeth 18 and the wheel teeth 17 can be reliably prevented.

Further, since the axial interval between the housing side step surface 24b and the worm side step surface 27a is smaller than the axial length of the fitting portion of the cover 42 to the opening portion of the holding recess 23b on the other axial side, the cover 42 can be reliably prevented from falling off the opening portion of the holding recess 23b on the other axial side even if the worm 14a is displaced toward the other axial side. Configuration and operation of other parts are similar to those of the above-described first and second embodiments.

Fourth Example of Embodiment

Figure 7:
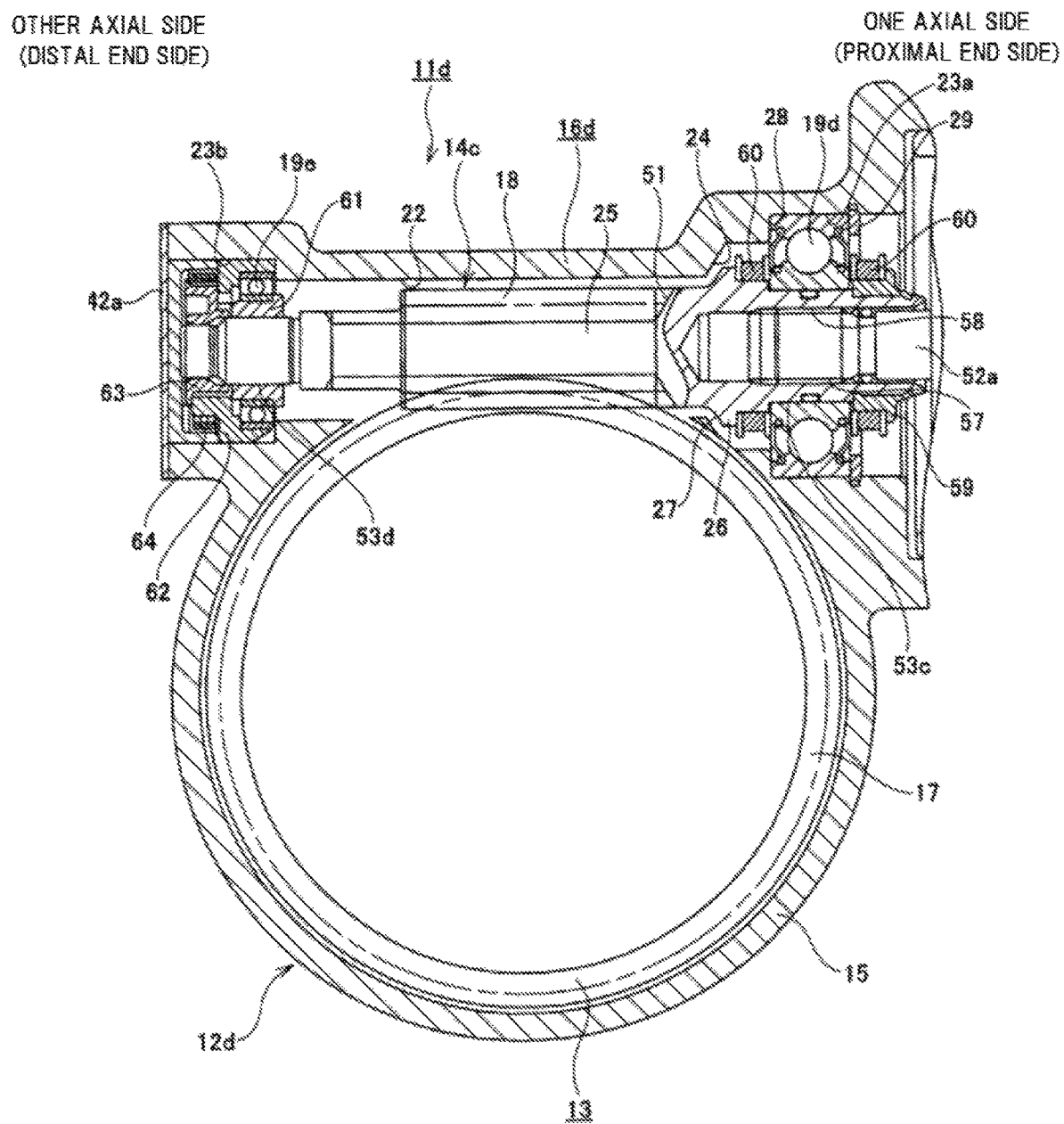
FIG. 7 is a cross-sectional view illustrating a forth example of an embodiment of the present invention.

FIG. 7 illustrates a fourth example of an embodiment of the present invention. In a worm reducer 11d of this example, similarly to the first example illustrated in FIG. 1, a small-diameter portion 22 is provided on an inner circumferential surface of an axial intermediate portion of a worm accommodating portion 16d constituting a housing 12d, and holding recesses 23a, 23b having an inner diameter larger than that of a small-diameter portion 22 are provided on inner circumferential surfaces of both axial end portions of the worm accommodating portion 16d. A housing side step surface 24 which faces the one axial side is provided on the other axial end portion (left end portion in FIG. 7) of a connection portion between the holding recess 23a on the one axial side (right side in FIG. 7) and the small-diameter portion 22.

The axial intermediate portion of the worm 14c includes a medium-diameter portion 25 having an outer diameter larger than that of a portion adjacent to the other axial side, and the worm teeth 18 are provided on an outer circumferential surface of a portion ranging from one axial side portion to the other axial end edge of the medium-diameter portion 25. In the outer circumferential surface of the worm 14c, the outward flange portion 26 protruding radially outward is provided on a portion adjacent to one axial side of the medium-diameter portion 25, and the worm side step surface 27 is provided on the other axial side surface of the outward flange portion 26.

In this example, the worm side step surface 27 and the housing side step surface 24 directly and closely face each other without any other member interposed therebetween. Therefore, due to a labyrinth effect occurring between the housing side step surface 24 and the worm side step surface 27, grease pushed out from the meshing portion between the wheel teeth 17 and the worm teeth 18 can be prevented from moving in the axial direction of the worm 14c and escaping from the small-diameter portion 22 arranged around the meshing portion of the worm accommodating portion 16c to a side of the rolling bearing 19a on the proximal end side. Consequently, lubricity of the meshing portion can be maintained for a long period of time.

Further, in this example, the axial interval between the housing side step surface 24 and the worm side step surface 27 is shorter than a minimum value of the axial interval between a tooth bottom surface of the dummy tooth portion 51 and a tooth tip surface of the wheel teeth 17 and shorter than the axial length of a fitting portion of the cover 42 to an opening portion of the holding recess 23b on the other axial side. Therefore, even when an impact load toward the other axial side is applied to the worm 14b such that the worm 14b is displaced toward the other axial side, interference between the tooth bottom surface of the dummy tooth portion 51 and the tooth tip surface of the wheel teeth 17 can be reliably prevented, and the cover 42 is reliably prevented from falling off from the opening portion of the holding recess 23b on the other axial side.

In this example, a male spline portion 57 provided on the outer circumferential surface of the distal end portion of the output shaft 52a of the electric motor 10 (see FIG. 10) and a female spline portion 58 provided on the inner circumferential surface of the proximal end portion of the worm 14c are spline-engaged with each other. With such a configuration, the output shaft 52a of the electric motor 10 and the proximal end portion of the worm 14c are directly connected to each other such that torque can be transmitted.

Among the pair of rolling bearings 19d, 19e, the inner ring constituting the rolling bearing 19d on the proximal end side is externally fitted to the bearing fitting portion 53c provided on the proximal end side portion of the worm 14c by a clearance fit. The outer ring constituting the rolling bearing 19d on the proximal end side is internally fitted and fixed to a bearing holding portion 23a on the one axial side provided at one end portion of the worm accommodating portion 16d by a clearance fit. An elastic member 60 having elasticity in the axial direction is installed between both axial end surfaces of the inner ring of the rolling bearing 19d on the proximal end side and a spacer 59 fixed by press fitting or crimping to one axial side surface of the outward flange portion 26 provided on the proximal end side portion of the worm 14c and one axial end portion of the worm 14c. That is, the inner ring constituting the rolling bearing 19d on the proximal end side is elastically clamped between one axial side surface of the outward flange portion 26 and the other axial side surface of the nut 59. The worm 14c can be thereby swung and displaced in the axial direction.

The outer ring of the roller bearing 19d on the proximal end side is clamped by an abutting step surface 28 present at the other axial end portion of the holding recess 23a on the one axial side and a retaining ring 29 engaged to an axial intermediate portion of the holding recess 23a on the one axial side.

On the other hand, among the pair of rolling bearings 19d, 19e, the inner ring constituting the rolling bearing 19e on the distal end side is externally fitted to the bearing fitting portion 53d provided on the proximal end side portion of the worm 14c with a bush 61 formed of an elastic material disposed therebetween. That is, the bush 61 is externally fitted to the bearing fitting portion 53d by a clearance fit, and the inner ring configuring the rolling bearing 19e on the distal end side is externally fitted and fixed to the bush 61 by an interference fit.

The outer ring constituting the rolling bearing 19e on the distal end side is internally fitted into the bearing holding portion 23b on the other axial side provided on the other axial end portion of the worm accommodating portion 16d via a holder 62. That is, the holder 62 is internally fitted and fixed to the bearing holding portion 23b on the other axial side by an interference fit, and the outer ring constituting the rolling bearing 19e on the distal end side is internally fitted into the holder 62 by a clearance fit. Further, a preload pad 63 formed of synthetic resin is externally fitted to the distal end portion of the worm 14c by a clearance fit, and a torsion coil spring 64 is provided between the preload pad 63 and the holder 62. The other axial end portion of the worm 14c is elastically pressed toward the worm wheel 13 in a close/separate moving direction with respect to the worm wheel 13 by the torsion coil spring 64. As a result, backlash at the meshing portion between the worm teeth 18 and the wheel teeth 17 is suppressed, and generation of tooth rattling noise at the meshing portion is suppressed.

In this example, the cover 42a is press-fitted or fixed by bolt fastening to the opening portion of the holding recess 23b on the other axial side. Configuration and operation of other parts are similar to those of the first example.

Fifth Example of Embodiment

Figure 8:
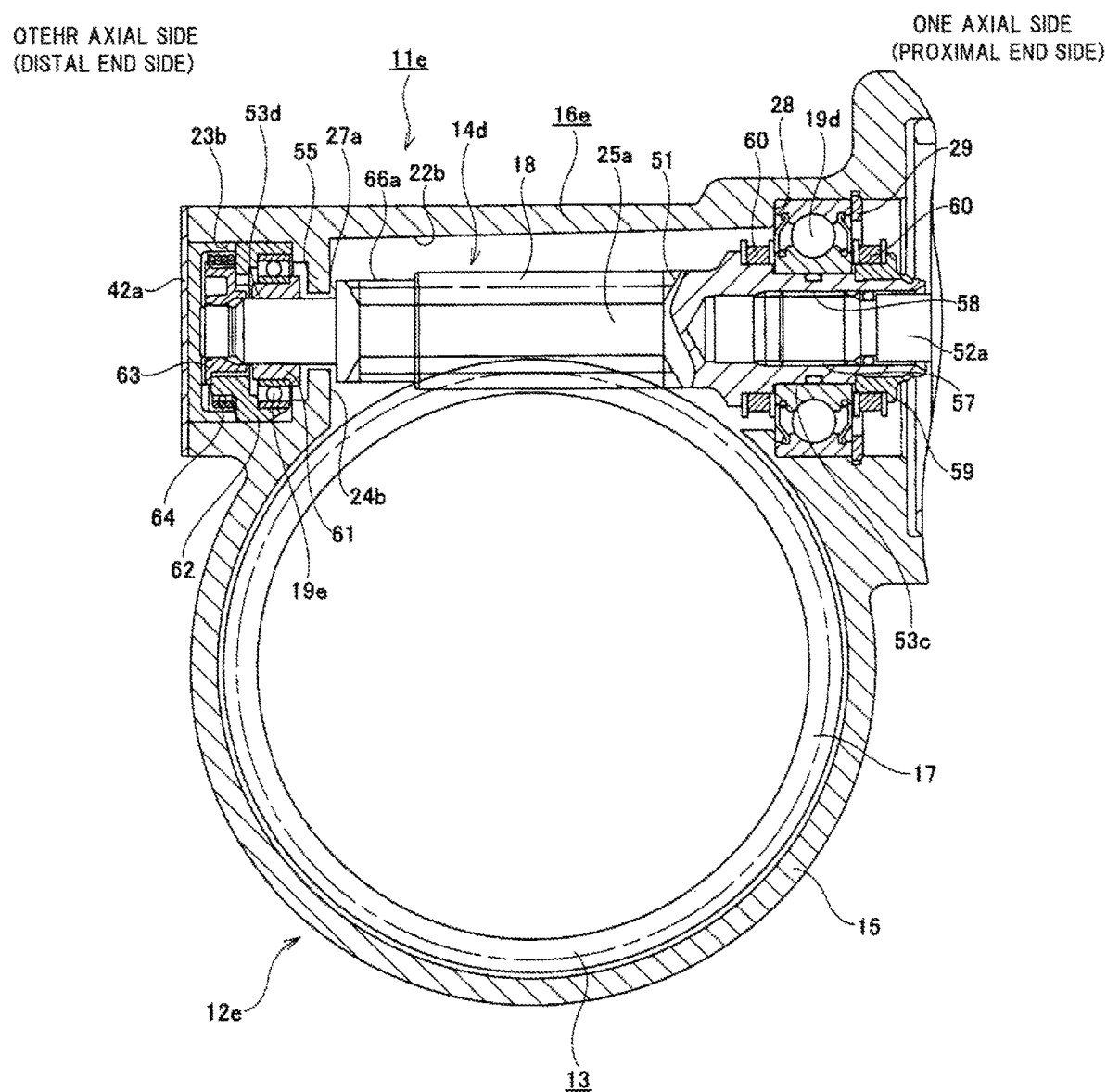
FIG. 8 is a cross-sectional view illustrating a fifth example of an embodiment of the present invention.

FIG. 8 illustrates a fifth example of an embodiment of the present invention. The worm reducer 11e of this example has a structure of a combination of the structure of the third example illustrated in FIG. 6 and the structure of the fourth example illustrated in FIG. 7. That is, a small-diameter portion 22b is provided at an axial intermediate portion of a worm accommodating portion 16e constituting a housing 12e, and an inward flange portion 55 protruding radially inward is provided on the other axial end portion of the small-diameter portion 22b. An axial side surface of the inward flange portion 55 is the housing side step surface 24b.

A bearing fitting portion 53d is provided at a front end side portion of a worm 14d, and a worm side step surface 27a facing the other axial side is provided at one axial end portion of the bearing fitting portion 53d. In other words, a step portion 66a having an outer diameter smaller than a tip diameter of the worm teeth 18 is provided at the other axial end portion of the medium-diameter portion 25a, and the bearing fitting portion 53d and the step portion 66a are connected by the worm side step surface 27a. Incidentally, the step portion 66a may be omitted similarly to the case of the third example as long as the outer diameter of the worm side step surface 27a is equal to or smaller than the tip diameter of the worm teeth 18. The housing side step surface 24b and the worm side step surface 27a directly and closely face each other without any other member disposed therebetween.

A male spline portion 57 provided on the outer circumferential surface of the distal end portion of the output shaft 52a of the electric motor 10 (see FIG. 10) and a female spline portion 58 provided on the inner circumferential surface of the proximal end portion of the worm 14d are spline-engaged with each other. The output shaft 52a of the electric motor 10 and the proximal end portion of the worm 14d are thereby connected to each other such that torque can be transmitted.

The proximal end side portion of the worm 14d is rotatably supported by a rolling bearing 19d on a proximal end side to the holding recess 23a on one axial side of the worm accommodating portion 16e, and the inner ring of the rolling bearing 19d on the proximal end side is elastically clamped by a pair of elastic members 60 having elasticity in an axial direction.

An outer ring of a rolling bearing 19e on a distal end side is held in the holder 62, and the torsion coil spring 64 is provided between the holder 62 and the preload pad 63 press-fitted into the distal end portion of the worm 14d. The distal end portion of the worm 14d is elastically pressed toward the worm wheel 13 in a close/separate moving direction with respect to the worm wheel 13 by the torsion coil spring 64. Configuration and operation of other parts are similar to those of the first, third, and fourth examples.

The present application is based on Japanese Patent Application No. 2016-184172 filed on Sep. 21, 2016 and Japanese Patent Application No. 2017-114833 filed on Jun. 12, 2017, the contents of which are incorporated herein by reference.

DESCRIPTION OF REFERENCE NUMERALS 1 steering wheel
2 steering gear unit
3 input shaft
4 tie rod
5 steering shaft
6 steering column
7 universal joint
8 intermediate shaft
9 universal joint
10 electric motor
11, 11a to 11e worm reducer
12, 12a to 12e housing
13 worm wheel
14, 14a to 14d worm
15 wheel accommodating portion
16, 16a to 16e worm accommodating portion
17 wheel teeth
18 worm teeth
19a to 19d rolling bearing
20 pressing piece
21 coil spring
22 small-diameter portion
23a, 23b holding recess
24, 24a, 24b housing side step surface
25, 25a medium-diameter portion
26 outward flange portion
27, 27a worm side step surface
28 abutting surface
29 retaining ring
30 elastic biasing mechanism
31 outer holder
32 bearing holder
33 leaf spring
34 wedge-shaped piece 35 holder main body
36 lid body
37 notch portion
38 torsion coil spring
39 small-diameter cylindrical portion
40 coil portion
41 arm portion
42, 42a cover
43 torque transmission joint
44 driving-side transmission member
45 driven-side transmission member
46 coupling
47 driving-side concave-convex portion
48 driven-side concave-convex portion
49 connecting shaft portion
50 coupling-side concave-convex portion
51 dummy tooth portion
52, 52a output shaft
53a to 53d bearing fitting portion
54 inward flange portion
55 inward flange portion
56 cylindrical surface portion
57 male spline portion
58 female spline portion
59 spacer
60 elastic member
61 bush
62 holder
63 preload pad
64 torsion coil spring
65 cylindrical surface portion
66, 66a step portion

The invention claimed is:

1. A worm reducer comprising:
a housing including a wheel accommodating portion, and a worm accommodating portion which has a center axis arranged at a skew position with respect to a center axis of the wheel accommodating portion and which includes an axial intermediate portion open to the wheel accommodating portion;
a worm wheel including wheel teeth disposed on an outer circumferential surface, the worm wheel being rotatably supported inside the wheel accommodating portion; and
a worm including worm teeth disposed on an outer circumferential surface to mesh with the wheel teeth, the worm being rotatably supported inside the worm accommodating portion, wherein a proximal end portion of the worm is connected to a drive shaft such that torque can be transmitted,
wherein an inner circumferential surface of the worm accommodating portion includes a housing side step surface which faces a proximal end side in an axial direction of the worm,
wherein an outer circumferential surface of the worm includes a worm side step surface which faces the housing side step surface in the axial direction at a portion axially deviated from a portion where the worm teeth are disposed,
wherein the housing side step surface and the worm side step surface are parallel to each other,
wherein an axial interval between the worm side step surface and the housing side step surface is shorter than a minimum value of an axial interval between a tooth bottom surface of a dummy tooth portion present at an end portion of the worm teeth on a proximal end side in the axial direction of the worm and a tooth tip surface of the wheel teeth,
wherein the housing side step surface is inclined such that an inner diameter increases as proceeding toward the proximal end side,
wherein the worm side step surface is inclined such that an outer diameter increases as proceeding toward the proximal end side,
wherein holding recesses are provided on inner circumferential surfaces of one axial side and another axial side of the worm accommodating portion, a smaller-diameter portion is provided on an inner circumferential surface of the axial intermediate portion of the worm accommodating portion, each holding recess having an inner diameter larger than that of the small-diameter portion, and
wherein an elastic biasing mechanism is provided in the holding recess on the other axial side of the worm accommodating portion, the elastic biasing mechanism is configured to elastically bias the distal end portion of the worm toward the worm wheel.

2. The worm reducer according to claim 1,
wherein the housing side step surface is provided around an entire circumference of the worm accommodating portion, and the worm side step surface is provided around an entire circumference of the worm.

3. The worm reducer according to claim 1,
wherein the worm side step surface is provided on the outer circumferential surface of the worm at a portion closer to a proximal end side than the worm teeth in the axial direction of the worm and has an outer diameter larger than a tip diameter of the worm teeth.

4. The worm reducer according to claim 1,
wherein the worm side step surface is provided on the outer circumferential surface of the worm at a portion on a distal end side than the worm teeth in the axial direction of the worm and has an outer diameter equal to or smaller than a tip diameter of the worm teeth.

5. The worm reducer according to claim 1,
wherein a distal end portion of the worm is supported by a bearing,
wherein the housing includes a holding recess having an opening portion which internally fits and holds the bearing,
wherein a cover is provided to fit into the holding recess to close the opening portion, and
wherein an axial interval between the worm side step surface and the housing side step surface is shorter than an axial length of a fitting portion of the cover to the opening portion of the holding recess.

6. The worm reducer according to claim 1, wherein the elastic biasing mechanism is displaceable in the radial direction of the worm.

7. The worm reducer according to claim 1, wherein an outer diameter of the dummy tooth portion is smaller than an inner diameter of the small diameter portion.

8. The worm reducer according to claim 1, wherein a bearing is provided inside each of the holding recesses.

9. The worm reducer according to claim 8, wherein the elastic biasing mechanism includes
a bearing holder in which a bearing is fitted,
a pair of wedge shaped pieces provided between an inner circumferential surface of the holding recess on the other axial side of the worm accommodating portion and an outer circumferential surface of the bearing holder, the pair of wedge shaped pieces being in slidable contact with an inner circumferential surface and the outer circumferential surface of the holding recess on the axial side of the work accommodating portion, and an urging member urging the pair of wedge shaped pieces in a direction in which each of the pair of wedge shaped pieces slides away from a meshing portion between the worm wheel and the worm.

* * * * *